EXAMINER
233

April 14, 1970 L. C. FOSTER 3,506,835

657,561

PHOTO-DETECTOR SIGNAL-TRANSLATING DEVICE

Filed Aug. 1, 1967

Inventor
Leigh Curtis Foster

By [signature]
Attorney

United States Patent Office 3,506,835

Patented Apr. 14, 1970

3,506,835

PHOTO-DETECTOR SIGNAL-TRANSLATING DEVICE

Leigh Curtis Foster, Atherton, Calif., assignor to Zenith Radio Corporation, Chicago, Ill., a corporation of Delaware Filed Aug. 1, 1967, Ser. No. 657,561
Int. Cl. H04b 9/00
U.S. Cl. 250—199 8 Claims

ABSTRACT OF THE DISCLOSURE

A photo-detector device in which reflected energy is minimized at the light-wave-responsive surface, with a resulting increase in its effective quantum efficiency, by canting the detector surface at Brewster's angle relative to the incident plane-polarized light beam. The invention is described in a laser heterodyne system, in which it provides a substantial (i.e., up to 60% or more) improvement in the system's sensitivity.

BACKGROUND OF THE INVENTION

The present invention pertains to photo-electric signal-translating devices.

In a conventional photo-detector system utilizing polarized light, the light source projects a beam of light which is polarized and intercepts the light-wave-responsive surface of the photo-detector at an angle of incidence substantially equal to zero degrees. Because of the high refractive index of a typical light-wave-responsive material, such as silicon or germanium, a considerable fraction (typically 30 to 40%) of the incident light-wave energy is reflected by the light-wave-responsive surface. If this lost light-wave energy could be made available for detection, the effective quantum efficiency of the photo-detector would be correspondingly improved. Since quantum efficiency refers to the ratio of electron charges resulting in the device to the number of incident photons, allowing more photons to enter the material creates more electron charges and, hence, an increased effective quantum efficiency.

A known technique used to reduce the amount of reflected light-wave energy is the coating of the light-wave-responsive surface of the photo-detector with an anti-reflection material. However, because typical detector surfaces are not uniform, it is difficult to maintain close anti-reflective coating tolerances. Moreover, the high temperature involved in applying the anti-reflective coating may destroy the device.

It is an object of this invention, therefore, to provide a new and improved photo-electric detector system in which the effective quantum efficiency is increased.

It is a further object of the invention to reduce the amount of reflected light-wave energy at the light-wave-responsive surface of the photo-detector device.

SUMMARY OF THE INVENTION

In accordance with the invention, a photo-electric signal-translating device responsive to an input light-wave signal comprises photo-detector means, including a light-wave-responsive surface of a material having a predetermined refractive index and canted relative to the input light-wave signal at an angle in the range of 30 to 85 degrees, and preferably at an angle whose tangent is substantially equal to the numerical value of the predetermined refractive index, for converting the light-wave signal to a corresponding electrical output signal. Means coupled to the photo-detector means are provided for utilizing the electrical output signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

DESCRIPTION OF THE PREFERRED EMBODIMENTS

Figure 1:
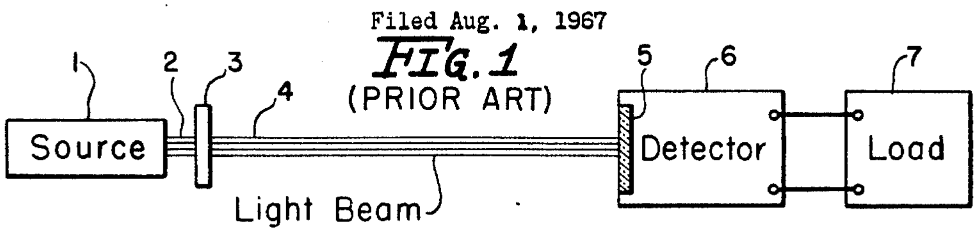
FIG. 1 (PRIOR ART)
FIGURE 1 is a schematic diagram illustrating a conventional photo-detector system.

With reference to the prior art system of FIGURE 1, a light source 1 projects a light beam 2 consisting of randomly polarized light waves through the plane-polarizing means 3. The resulting plane-polarized light beam 4 intercepts the light-wave-responsive surface 5 of the photo-detector 6. The polarized light beam 4 is perpendicular to the light-wave-responsive surface 5 of the photo-detector 6, so that by definition the angle of incidence of the polarized light beam 4 relative to the light-wave-responsive surface 5 is zero degrees. The photo-detector 6 develops across a suitable load 7 an electrical output signal corresponding to variations in the intensity of the polarized light beam 4.

The material used for the light-wave-responsive surface 5 is a material whose electrical conductivity changes upon illumination; the intensity of illumination determining the magnitude of the change in the electrical conductivity of the material. The term "illumination" as used in this art refers not merely to the projecting of light upon a material, but more specifically, to the operation whereby light is absorbed into and transmitted through a material. Since reflected light does not illuminate the light-wave-responsive surface 4, loss of illumination due to reflection, for a given intensity of polarized light beam 4, results in a failure to fully utilize the incident light. This results in a failure to obtain the maximum possible change of electrical conductivity in the light-wave-responsive surface 5 which therefore results in a failure to achieve the maximum electrical output signal that the device is capable of producing and delivering to the load 7.

The conventional light-wave-responsive surface 5 is typically constructed of silicon or germanium, both of which have a high refractive index (typically about 4.0). Because of this high refractive index, a considerable fraction of the incident light-wave energy is lost by reflection at the surface 5. The amount of light-wave energy reflected is typically one-third or more (36 percent for a refractive index equal to 4.0) of the incident light.

Figure 2:
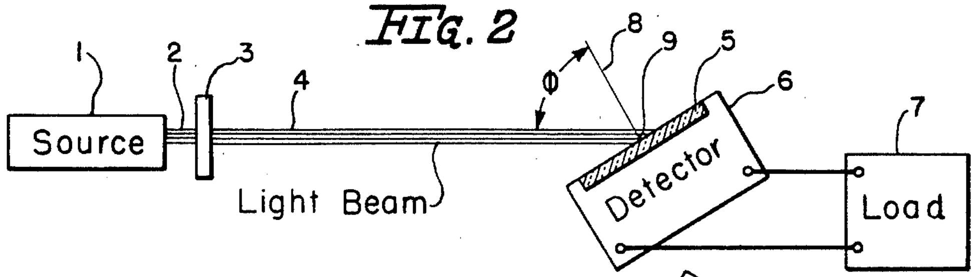
FIGURE 2 is a schematic diagram illustrating an embodiment of the invention.

For purposes of illustration, one basic form of the invention is depicted in FIGURE 2. Light source 1 projects a light beam 2 consisting of randomly polarized light waves through a plane-polarizing means 3. The resulting plane-polarized light beam 4 propagates towards the photo-detector 6. As in the prior art system of FIGURE 1, the light-wave-responsive surface 5 of photo-detector 6 intercepts the plane-polarized light beam 4 and develops a corresponding electrical output signal which is delivered to the load 7. However, in accordance with the invention, the light-wave-responsive surface 5 is canted relative to the polarized light beam at an angle of incidence, $\phi$, whose tangent is substantially equal to the numerical value of the refractive index of the material of which the light-wave responsive surface 5 is composed.

The photo-electric system shown in FIGURE 2, which utilizes the present invention, is an improvement over the conventional photo-electric system shown in FIGURE 1. The operation here is similar to the operation of the system in FIGURE 1 with the notable exception that, by canting the surface 4 at the unique angle of incidence, $\phi$, the amount of incident light-wave energy reflected by surface 5 is a minimum. This unique angle of incidence is determined according to Brewster's law and is typically 70 to 80 degrees for the typical photo-detector surface material composed of germanium or silicon. By canting the surface 5, one might expect a tendency for the light to "glance-off" and be lost. And by canting the surafce 5 at an angle of 70 degrees or more (90 degrees corresponding to the surface 5 being parallel to the polarized light beam 4), one might expect this loss to be considerable. However, when the angle of incidence is chosen such that its tangent is substantially equal to the numerical value of the refractive index of the material of which surface 5 is composed, and the incident polarzied light beam 4 is plane-polarized by plane-polarizing means 3 in the plane of incidence (the plane of incidence being defined by the axis of propagation of the incident light beam 4 and the normal reference line 8 to the surface 5 at the point of incidence 9), then virtually all of the incident light is refracted and none is reflected, with optimum effective quantum efficiency being achieved. It is interesting to point out that, although a maximum effective quantum efficiency is obtained when the surface is canted at Brewster's angle, a substantial increase in effective quantum efficiency is obtained for canting of the surface within a broad range of angles which includes Brewster's angle (i.e. in the range of 30° to 85° when Brewster's angle equals 76°).

Figures 3, 4:
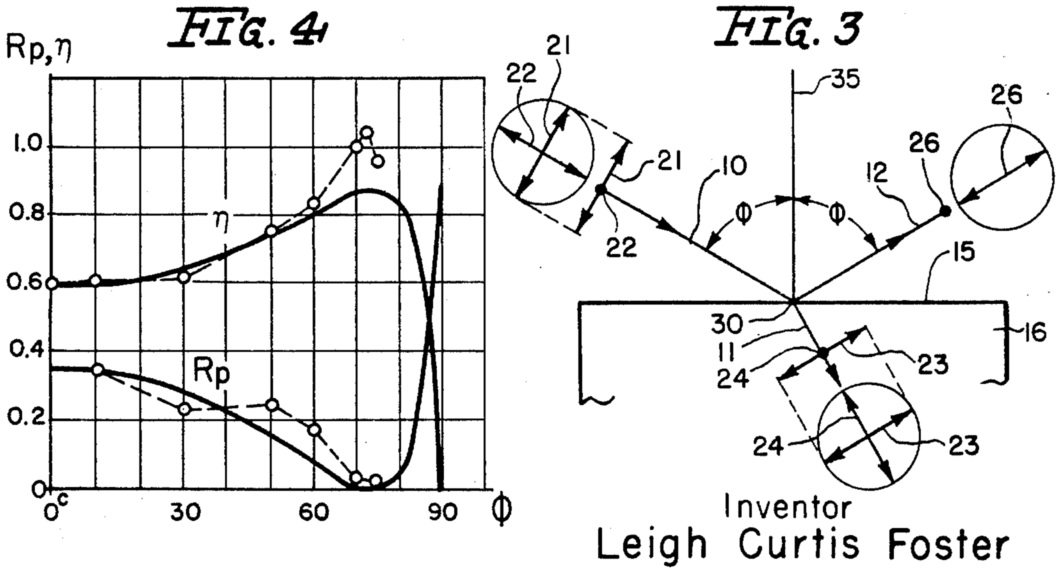
FIGURE 3 is an explanatory diagram illustrating Brewster's law.
FIGURE 4 is a graphical representation illustrating the operating characteristics of an embodiment of the invention.

The operation of the invention and the advantage of canting the light-wave-responsive surface at Brewster's angle can further be understood by referring to FIGURE 3, which illustrates Brewster's law. In the ensuing discussion, surface 15 of material 16 is considered as lying in a vertical plane extending perpendicular to the plane of the drawing. Incident light wave 10 is a randomly polarized light wave which may be considered as composed of horizontally and vertically polarized components 21 and 22 respectively. Light wave 10 is incident upon surface 15 at the point of incidence 30 from which the reflected wave 12 is reflected at an angle equal to the angle of incident, $\phi$, and the refracted wave 11 is transmitted through the material 16 at an angle determined by the refractive index, $\eta$ of the material 16. Waves 11 and 12 may similarly be considered as composed of horizontally and vertically polarized components which are represented by the associated double-pointed arrows. According to the laws of optics, incident light-wave 10, refracted wave 11· reflected wave 12, and the normal reference line 35 are all in the plane of incidence. The double-pointed arrows shown in the circle represent the respective horizontally and vertically polarized components as seen in the direction of propagation.

In order to understand Brewster's law, a basic knowledge of reflection and refraction is required. When an incident light wave strikes a refractive surface, it sets the atoms at the point of incidence into oscillation. Since the incident light wave contains both horizontally and vertically polarized components, the atomic vibrations in the material contain corresponding horizontal and vertical components. Reradiation from these atoms creates a refracted wave and a reflected wave each of which, in the general case, comprises horizontally and vertically polarized components. According to the laws of optics, the refracted wave is refracted at an angle determined by the refractive index of the material and the reflected wave is reflected at an angle equal to the angle of incidence.

According to Brewster's law, the angle between the reflected wave and the refracted wave is 90 degrees when the tangent of the angle of incidence is numerically equal to the refractive index of the material. This is the condidition illustrated in FIGURE 3. The atoms oscillating in the material 16 at the point of incidence 30, in response to the horizontally and vertically polarized components 21 and 22 of the incident light wave 10, cause corresponding horizontally and vertically polarized components, 23 and 24 respectively, to be refracted through the material 16 and a vertically polarized component 26 to be reflected at an angle, $\phi$, equal to the angle of incidence. However, there is no reflected horizontally polarized component because the atomic vibrations induced by the horizontally polarized component 21 of the input wave 10 are in the direction parallel to the path of the reflected wave 12 and therefore create no tranverse wave motion relative to that path. In other words, the horizontal polarization component of the reflected wave 12 is reduced to zero when the angle of incidence is equal to Brewster's angle. Since this elimination of reflection can be accomplished in only one plane at a time, this reduced-intensity reflected light wave 12 represents the minimum-intensity reflected light wave possible for an incident polarized light wave of a given intensity. By employing an incident light wave which is horizontally polarized, the vertical polarization components 22, 24, and 26 of FIGURE 3 are eliminated. In this event all of the light is refracted and there is no reflected wave 12, a condition corresponding to total illumination and optimum effective quantum efficiency.

FIGURE 4 illustrates a graph which represents the experimental results of one embodiment of the present invention. It will be understood that these experimental results are included purely by way of illustration and in no sense impose a limitation on the invention. Relative values of the reflectivity, $R_p$, and the quantum efficiency, $\eta$, of a photo-detector are plotted on the vertical axis of the graph while the angle of incidence is plotted on the horizontal axis in degrees. The solid-line curves represent theoretical values whereas the dotted-line curves represent experimental values.

As an experimental example, a typical germanium junction photo-diode (RCA–SQ–2516) was chosen utilizing a conventional planar configuration. Since the refractive index of germanium is approximately 4.0 in the visible and infrared spectrum, Brewster's angle is approximately 76 degrees and its power reflectivity at normal incidence is about 36 percent. Elimination of this 36 percent reflection loss would therefore result in an increase in effecive quantum efficiency, $\eta$, by the factor of 1/0.64=1.56, or a 56 perecnt increase over the value of $\eta$ at normal incidence. The effective quantam efficiency was obtained by measuring the incident optical power, $P_o$, with a bolometer and recording the change in DC current, ΔI, through the photo-diode while the incident polarized light beam was blocked and unblocked. From this data, the effective quantum efficiency was calculated using the well-known equation below:

$$\eta = \frac{h\nu}{e}\left(\frac{\Delta I}{P_o}\right) = 1.96\left(\frac{\Delta I}{P_o}\right)$$

Where ΔI and $P_o$ are in amperes and watts, respectively, $e$ is the unit electronic charge, $h$ is Planck's constant and $\nu$ is the frequency.

At normal incidence the effective quantum efficiency at 0.6328$\mu$ was measured to be 59 percent. Thus one should expect to obtain maximum of (0.59)(1.56)=.92 or 92 percent effective quantum efficiency at Brewster's angle.

Measurements performed on a germanium junction photo-diode utilized in accordance with the invention confined the predicted increase in effective quantum efficiency. To make such measurements, the detector was carefully centered on a rotating table, with the polarized light beam focused down to a small spot size compared to the light-wave-responsive surface of the detector. The detector was positioned so that the spot remained on the light-wave-responsive surface even at a grazing incidence. Both incident and reflected beam powers were measured, and the results (i.e. the reflectivity) are shown by the dotted-line graph of $R_p$ in FIGURE 4.

Because of the uncertainty as to the state of the surface layer, an exact theoretical curve, including the effects of the finite conductivity of the germanium, was not attempted. However, using the simple formula applicable to ideal lossless dielectrics, a reflectivity curve was computed from the following equation:

$$R_p\left(\frac{n^2 \cos \phi-\sqrt{n^2-\sin^2 \phi}}{n^2 \cos \phi+\sqrt{n^2-\sin^2 \phi}}\right)^2$$

where $\phi$ is the angle of incidence and $n$ is refractive index of the light-wave-responsive material (germanium in this example). This equation was used to yield the solid-line curve for $R_p$ in the graph in FIGURE 4.

A theoretical curve for the effective quantum efficiency $\eta$ ($\phi$) at angle $\phi$ can similarly be computed from $R_p$ ($\phi$) at the same angle $\phi$ by the relation given in the following formula:

$$\eta(\phi)=\left(\frac{1-R_p(\phi)}{1-R_p(0)}\right)(\eta(0)$$

where $\eta$ (0) and $R_p$ (0) are the values corresponding to normal incidence. This equation yields the solid-line curve of $\eta$ in FIGURE 4.

The correspondence between theoretical and actual values is not exact but a substantial increase in the effective quantum efficiency is obtained with angles of incidence within the range of 30 to 85 degrees. A maximum increase in the effective quantum efficiency of over 60 percent occurs when the angle of incidence is equal to Brewster's angle.

Figure 5:
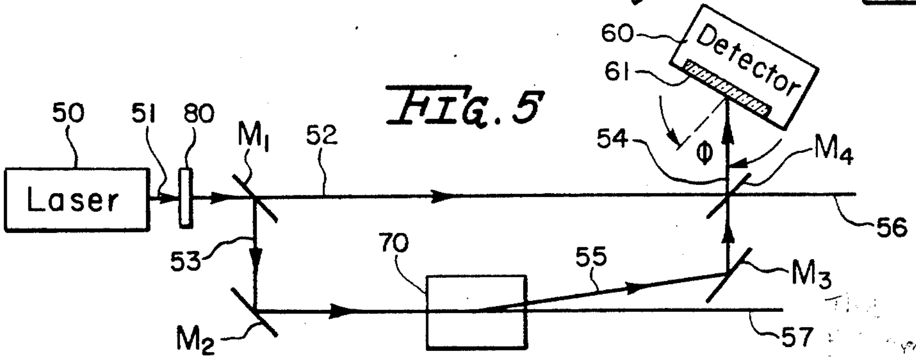
FIGURE 5 is a schematic diagram depicting another embodiment of the invention.

A laser heterodyne system shown in FIGURE 5 comprises another embodiment of the invention. Laser 50 projects an amplitude-modulated laser beam 51 through the polarizing means 80 towards a semi-transparent mirror $M_1$. Two beams emerge from the semi-transparent mirror $M_1$, a transmitted beam 52 and a reflected beam 53. Transmitted beam 52 intercepts another semi-transparent mirror $M_4$ and is divided into two beams. One beam 56 is transmitted through the semi-transparent mirror $M_4$ and becomes the unused signal beam. The other beam 54 is reflected and intercepts laser-beam-responsive surface 61 of detector 60 at an angle of incidence $\phi$ whose tangent is substantially equal to the numerical value of the refractive index of the material of which the surface 61 is composed (i.e. Brewster's angle). This beam 54 corresponds to an intelligence-bearing carrier frequency in a conventional heterodyne radio receiver.

The reflected beam 53 is directed to a conventional mirror $M_2$ and is reflected towards a frequency-translating device 70 (e.g. a Bragg cell). Two beams emerge from device 70, a refracted beam 55 to serve as a local oscillator signal and an unconverted beam 57 which is not used in this system. The converted beam 55 corresponds to a local oscillator frequency in this system, and is reflected towards semi-transparent mirror $M_4$ by a conventional mirror $M_3$. Most of beam 55 is transmitted through mirror $M_4$ and coincides with beam 54. The rest is reflected as unused signal beam 56. Mirrors $M_2$ and $M_3$ are positioned relative to mirrors $M_1$ and $M_4$ to insure that beams 54 and 55 retain their polarization as determined by polarizer 80 and have wave fronts that are parallel over the surface 61 within a small fraction of a wave-length. With beams 54 and 55 intercepting surface 61 at Brewster's angle, the reflected laser-beam energy is reduced and the quantum efficiency of the system is correspondingly increased. Since the sensitivity of a laser heterodyne system is directly related to the effective quantum efficiency of the detector, the system's sensitivity is correspondingly increased. Improvements in sensitivity of 60 percent or even more are thus attainable with no increase in equipment cost since the only modification required is a change in the orientation of the detector. The system, as shown, allows some signal beam to be wasted, which is not necessary but is convenient for a simple explanation; other techniques are available to eliminate such signal losses.

Thus the invention provides a new and improved photoelectric system having a photo-detector with a substantially increased quantum efficiency. By canting the light-wave-responsive surface at an angle within the range of 30 to 85 degrees relative to a polarized input light wave, a substantial increase in quantum efficiency is obtained. A maximum increase in quantum efficiency of over 60 percent is obtained when the surface is canted at Brewster's angle. The invention is also useful in a laser heterodyne system to provide a substantial improvement in the system's sensitivity.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A photo-electric signal-translating device responsive to an input light-wave signal comprising:

photo-detector means, comprising a light-wave-responsive surface of a material having a predetermined refractive index and canted relative to said input light-wave signal at an angle in the range of 30 to 85 degrees, for converting said input light-wave signal to a corresponding electrical output signal;

and means coupled to said photo-detector means for utilizing said electrical output signal.

2. A photo-electric signal-translating device responsive to an input light-wave signal comprising:

photo-detector means, comprising a light-wave-responsive surface of a material having a predetermined refractive index and canted relative to said input light-wave signal at an angle whose tangent is substantially equal to the numerical value of said predetermined refractive index, for converting said input light-wave signal to a corresponding electrical output signal;

and means coupled to said photo-detector means for utilizing said electrical output signal.

3. A photo-electric device according to claim 1 in which input light-wave signal is plane-polarized.

4. A photo-electric device according to claim 3 in which the plane of polarization of said input light-wave signal is the plane of incidence.

5. A photo-electric signal-translating device comprising:

means for projecting a laser beam;

photo-detector means intercepting said laser beam, comprising a laser-beam-responsive surface of a material having a predetermined refractive index and canted relative to said laser beam at an angle in the range of 30 to 85 degrees, for converting said laser beam to a corresponding electrical output signal;

and means coupled to said photo-detector means for utilizing said electrical output signal.

6. A photo-electric signal-translating device comprising:

means for projecting a laser beam;

photo-detector means intercepting said laser beam, comprising a laser-beam-responsive surface of a material having a predetermined refractive index and canted relative to said laser beam at an angle whose tangent is substantially equal to the numerical value of said predetermined refractive index, for converting said laser beam to a corresponding electrical output signal;

and means coupled to said photo-detector means for utilizing said electrical output signal.

7. A laser heterodyne system for intermodulating first and second laser beams at least one of which is modulated in accordance with an intelligence signal, said system comprising:

photo-detector means intercepting said first and second laser beams, comprising a laser-beam-responsive surface of a material having a predetermined refractive index and canted relative to each of said laser beams at an angle in the range of 30 to 85 degrees, for developing an electrical output signal containing said intelligence signal;

and means coupled to said photo-detector means for utilizing said electrical output signal.

8. A laser heterodyne system for intermodulating first and second laser beams at least one of which is modulated in accordance with an intelligence signal, said system comprising:

photo-detector means intercepting said first and second laser beams, comprising a laser-beam-responsive surface of a material having a predetermined refractive index and canted relative to each of said laser beams at an angle whose tangent is substantially equal to the numerical value of said predetermined refractive index, for developing an electrical output signal containing said intelligence signal;

and means coupled to said photo-detector means for utilizing said electrical output signal.

References Cited

UNITED STATES PATENTS

| | | | |
|---|---|---|---|
| 3,299,306 | 1/1967 | Kapany | 313—95 |
| 3,327,151 | 6/1967 | Adams | 313—95 |
| 3,414,728 | 12/1968 | Patel | 250—199 |
| 3,444,381 | 5/1969 | Wendland. | |

ROBERT L. GRIFFIN, Primary Examiner

A. J. MAYER, Assistant Examiner

U.S. Cl. X.R.

250—211; 313—95; 329—144